May 26, 1931. E. SCHLIEPHAKE 1,807,105
APPLIANCE FOR DIATHERMIC TREATMENT BY MEANS OF HIGH FREQUENCY
Filed July 18, 1930
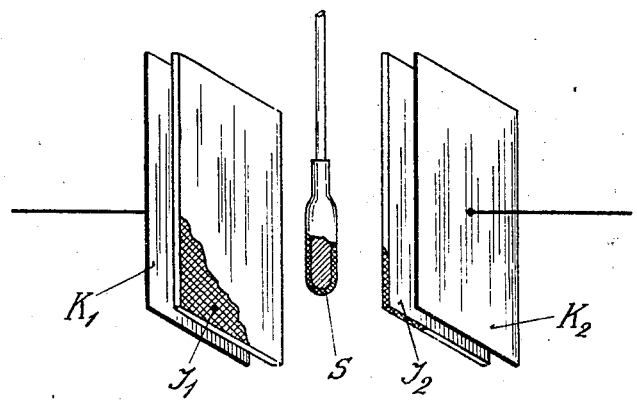
Inventor:
Erwin Schliephake
by
Attorney Patented May 26, 1931

1,807,105

UNITED STATES PATENT OFFICE

ERWIN SCHLIEPHAKE, OF JENA, GERMANY

APPLIANCE FOR DIATHERMIC TREATMENT BY MEANS OF HIGH FREQUENCY

Application filed July 18, 1930, Serial No. 468,821, and in Germany July 25, 1929.

In order to carry through an efficacious diathermic treatment by means of high frequency in the field of the condenser, it is of advantage to concentrate the energy on certain points. As it is not possible to introduce perhaps an electrode of the condenser into the human body and the other electrode externally thereof, it is suggested according to the invention, to place the part of the human body to be treated into a condenser and to provide a mass of metal in the field of the said condenser, which will cause the field lines of the condenser field to be drawn to the mass of metal and in consequence the parts close to it will be subjected to a stronger heating than would be the case with a condenser field of the customary type.

In order to give a practical example, for instance probes or bougie-pipes may serve as metal mass to be introduced into the respective cavities of the human body, as for instance, the stomach, nose, ears and wounds. For the treatment of alveolar abscesses metal plates of suitable form are placed into the mouth of the patient. These probes necessarily need not consist entirely of metal, but it will be advantageous to make these substantially of some insulating material and to provide them with corresponding metal inserts, in order to avoid scorching of the parts of the body with which they are in contact.

An embodiment of the arrangement according to the invention is shown in the drawing by way of example, purely diagrammatically.

Both the condenser plates $K_1$ and $K_2$ are located in a circuit coupled with the generator of the high frequency oscillations. On the surfaces facing the body of the patient these plates are preferably provided with coatings $J_1$ and $J_2$ of some suitable insulating material. The probe S surrounded by insulating material is introduced into the body of the patient.

I claim:

Apparatus for diathermic treatment by means of high frequency of the character described comprising a condenser, two condenser electrodes of larger size and a smaller at least partly metallic body, which is brought close to the point to be treated and by means of which body the condenser field is drawn to the place to be treated.

In testimony whereof I have affixed my signature.

ERWIN SCHLIEPHAKE.